US012262807B2

(12) United States Patent
Copp

(10) Patent No.: US 12,262,807 B2
(45) Date of Patent: Apr. 1, 2025

(54) BELT MOUNTED PAINT AND BRUSH HOLDER APPARATUS

(71) Applicant: Copp & Copp Enterprises, Inc., Port St Lucie, FL (US)

(72) Inventor: Erik D. Copp, Lantana, FL (US)

(73) Assignee: Copp & Copp Enterprises, Inc., Port St. Lucie, FL (US)

( * ) Notice: Subject to any disclaimer, the term of this patent is extended or adjusted under 35 U.S.C. 154(b) by 195 days.

(21) Appl. No.: 17/811,966

(22) Filed: Jul. 12, 2022

(65) Prior Publication Data

US 2024/0016286 A1 Jan. 18, 2024

(51) Int. Cl.

| | |
|---|---|
| ***A45F 5/02*** | (2006.01) |
| ***B44D 3/12*** | (2006.01) |
| ***B44D 3/14*** | (2006.01) |

(52) U.S. Cl.

CPC .............. *A45F 5/021* (2013.01); *B44D 3/121* (2013.01); *B44D 3/14* (2013.01)

(58) Field of Classification Search

CPC .............. A45F 2200/0575; A45F 5/021; A45F 2003/003; A45F 2003/008; A45F 3/005; B44D 3/121; B44D 3/14; B44D 3/24; B44D 3/12; B44D 3/123; B44D 3/127; B44D 3/128

USPC ........................................................ 224/148.4

See application file for complete search history.

(56) References Cited

U.S. PATENT DOCUMENTS 4,433,801 A * 2/1984 Swinney .................. B44D 3/14 224/268
4,746,042 A * 5/1988 King ......................... A45F 5/02 224/663
5,489,051 A 2/1996 Robinson
5,695,098 A * 12/1997 King ........................ B44D 3/12 224/241
6,283,345 B1 9/2001 Butschat
6,866,172 B2 3/2005 Shackelford
6,945,440 B1 9/2005 Ford
8,505,788 B2 * 8/2013 Thibault .................. B44D 3/14 224/183
8,783,538 B1 7/2014 Dattilo
2003/0111497 A1 6/2003 Lukaris
2017/0055684 A1 * 3/2017 Jackson .................... A45F 3/14
2019/0322124 A1 * 10/2019 Keane ..................... A45F 5/021

FOREIGN PATENT DOCUMENTS

FR 2656848 A2 * 7/1991

OTHER PUBLICATIONS

FR-2656848-A2 Translation, Theo, Jul. 12, 1991 (Year: 1991).*

* cited by examiner

*Primary Examiner* — Nathan J Newhouse
*Assistant Examiner* — Matthew T Theis
(74) *Attorney, Agent, or Firm* — McHale & Slavin, P.A.

(57) ABSTRACT

A belt mounted paint and applicator holder apparatus adapted for stability and convenience comprising of a bucket portion, a top portion being nestable on the bucket portion upper open end, a pair of opposing toggle latches to cooperate with corresponding toggle latches on the bucket outer surface to form a clasped position wherein the bucket and top portion are nestled together, a buckle belt coupler having a pair of first vertical slots for insertion of a belt therethrough, and a quick-connect self-leveling coupling mechanism between the top and bucket portion, when in the clasped position, to maintain stability and self-leveling.

5 Claims, 6 Drawing Sheets

BELT MOUNTED PAINT AND BRUSH HOLDER APPARATUS

FIELD OF THE INVENTION

The present invention relates to the field of paint holders or buckets and, more particularly, to a belt mounted paint and brush holder adapted for stability and convenience.

BACKGROUND OF THE INVENTION

Painters working on large areas customarily utilize long-handled tools and obtain their paint from buckets placed on the floor or, in the case where the paint area is elevated, then on a scaffold. These techniques are suitable for painting large areas; however, for smaller paint areas, a more convenient approach is utilizing a paint brush for smaller paint strokes and the retrieval of paint comes from a paint bucket.

Painting with a paint brush is an awkward and messy endeavor, even for professionals. The common method employed by most painters is that of holding the paint can (while trying to maintain a stable and level position), dipping the paint brush therein, and removing the excess paint from the brush against the inner lip of the paint can; however, this method has many disadvantages. For instance, the paint can must be manually carried or continuously moved to a new area as the work is completed. Furthermore, while painting with one hand, the other hand must maintain control of the paint can to prevent it from spilling and carry the bucket for the time it takes to complete the area. Long periods of time carrying a bucket with paint can result in muscle fatigue. When working from the ground, the painter usually places the bucket next to him. However, this placement of the paint bucket requires repeated bending to reapply the paint to the brush, resulting in less productivity. Furthermore, the threat of the bucket being kicked over by the painter focusing on the area he is painting and not where he is stepping is always a possibility. This results in time spent cleaning instead of painting.

At higher elevations, where the access to a paint can which is at ground level is not convenient, the painter takes the bucket up the ladder with him and possibly places it on a platform, if available. Climbing and descending the ladder with a paint can and a paint brush is usually accomplished by holding the paint can and paint brush in one hand and holding on to the ladder with the other. This technique is very dangerous, as it involves only the use of one hand to climb or descend a ladder. Carrying the paint brush inside the paint may seem workable if the level of paint is sufficiently low, but it is still less than ideal because the handle usually contacts wet paint on the inner walls of the paint bucket. Holding the wet brush and the paint can with one hand often results in unintentional paint splotches and drips on clothing and other surfaces. Advances in the field have alleviated some of these drawbacks by utilizing paint buckets that include ridges and magnets so that the metal paint brush does not make contact with the wet paint when in contact with the magnet, and excess paint can be removed from the paint brush by moving it along the ridges.

What is needed is a bodily-carried paint container that temporarily holds a sufficient amount of paint, is self-leveling and stable on a belt so that the painter may bend, turn, or contort without spilling paint therefrom, and allows the painter to use both hands while carrying the container.

SUMMARY OF THE INVENTION

A belt mounted paint and applicator holder apparatus adapted for stability and convenience is disclosed. The belt mounted paint and applicator holder is comprised of a bucket portion, a top portion being nestable on the bucket portion upper open end, a pair of opposing toggle latches to cooperate with corresponding toggle latches on the bucket outer surface to form a clasped position wherein the bucket and top portion are nestled together, a buckle belt coupler having a pair of first vertical slots for insertion of a belt therethrough, and a quick-connect self-leveling coupling mechanism comprised of a raised rounded knob on the bucket belt coupler to pair with an inverted U-shaped flange on the back end of the top portion to allow the top and bucket portion, when in the clasped position, the ability to rotate thereabout the raised knob for stability and self-leveling. The top portion back end includes a plurality of ridges on the interior surface of the top portion nearest the open top end to remove excess paint from an applicator, and further includes a magnet disposed on the interior surface of the top portion nearest the open top end to attach a metal applicator when not in use.

Accordingly, it is a primary objective of the instant invention to provide a device for holding paint nearest the painter without the use of his/her hands.

It is a further objective of the instant invention to provide a paint and applicator holder worn on a painter's belt at or near the waist.

It is yet another objective of the instant invention to provide a device that makes a painter's job safer, more stable, and convenient.

It is a still further objective of the invention to provide a paint and applicator holder to be worn at a convenient height to enable free use of both hands.

It is another objective of the instant invention to help avoid muscle tension and fatigue by providing a hands free device.

It is yet another objective of the instant invention to provide a quick-connect self-leveling coupling mechanism between the buckle belt coupler and the nestled top and bucket portion which can be easily connected and disconnected by the painter, as well as be self-leveling and stable while in use.

It is another objective of the instant invention to provide a separable top portion and bucket portion to make clean-up easier.

It is another objective of the instant invention to provide a metal applicator holder arranged so the painter can easily store and access the applicator. When the painter climbs the ladder, or otherwise does not need the applicator, it is held in a proper place.

Other objects and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Figure 1:
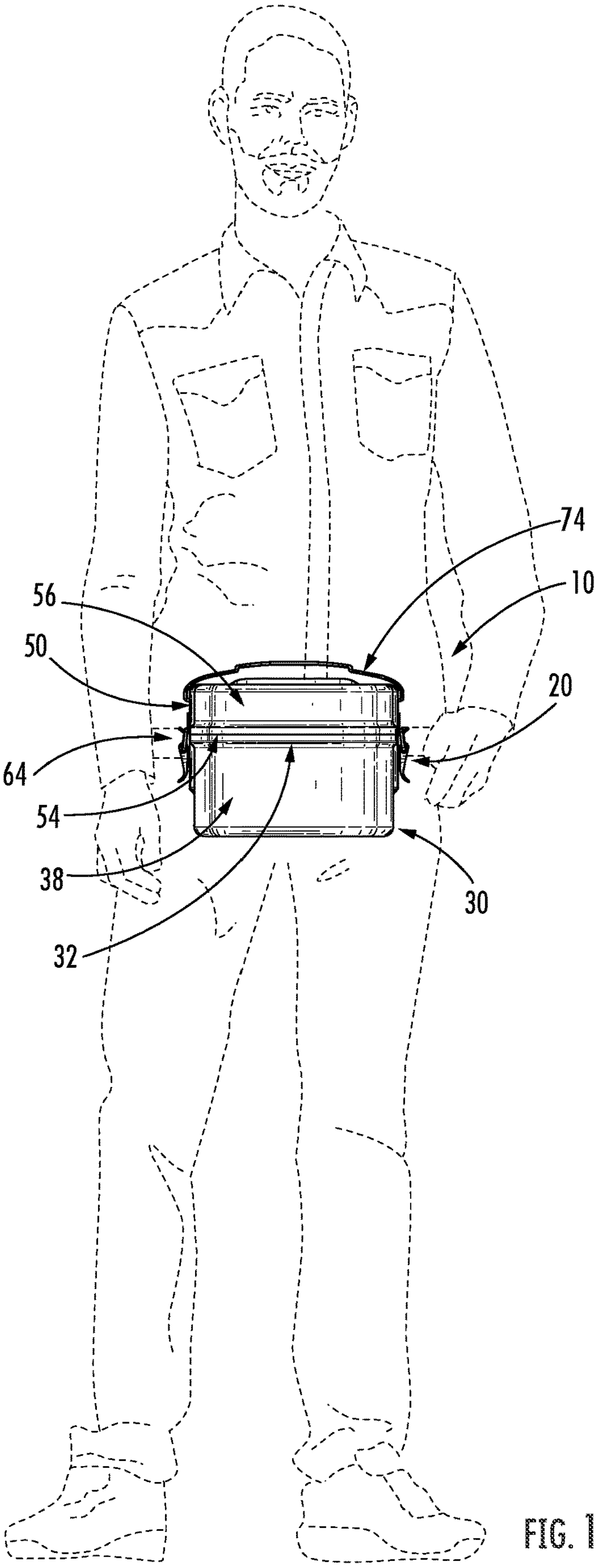
FIG. 1 is a front environmental view of the belt mounted paint and applicator holder apparatus.
Figure 2:
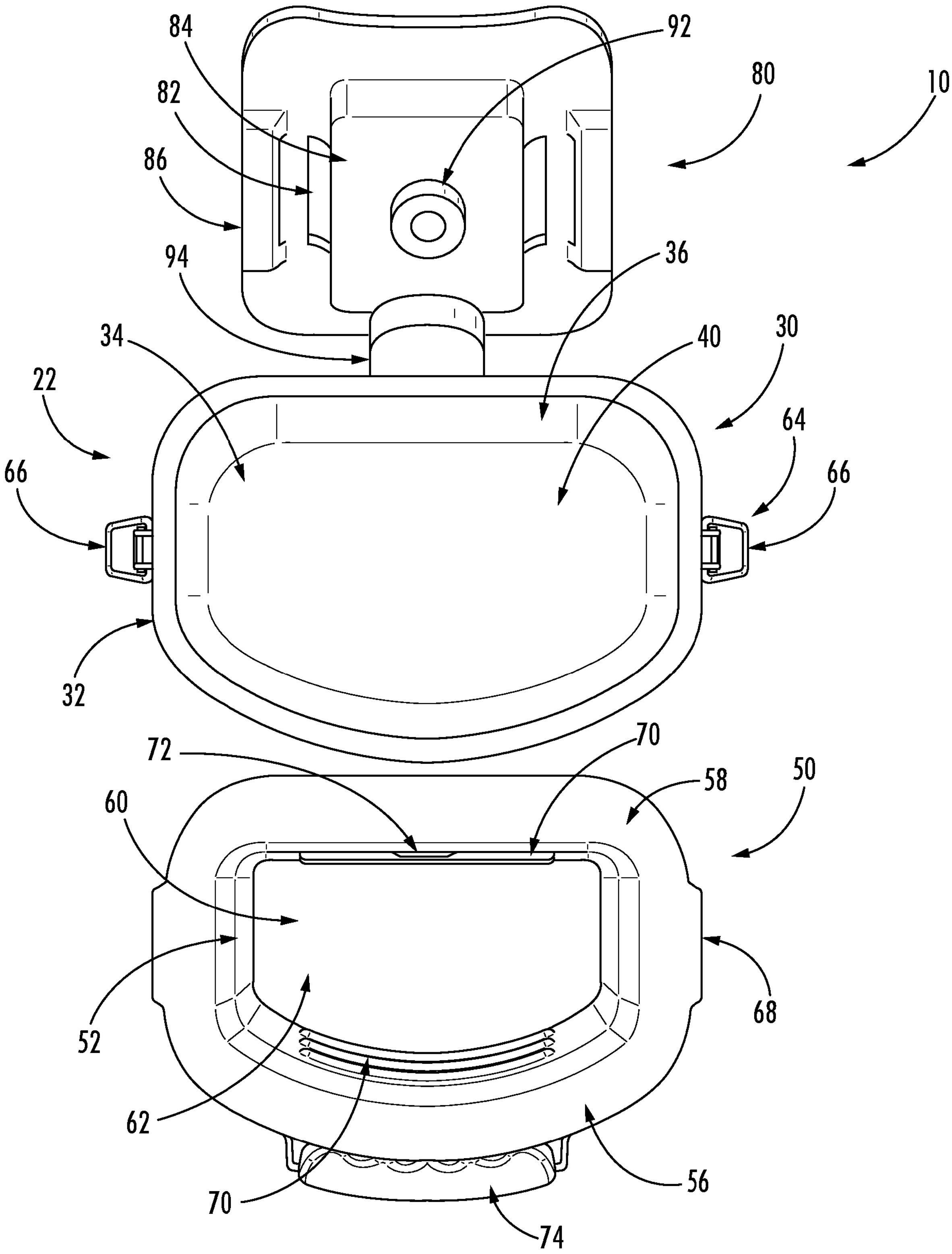
FIG. 2 is a perspective top view of the belt mounted paint and applicator holder apparatus in a disassembled state.
Figure 3:
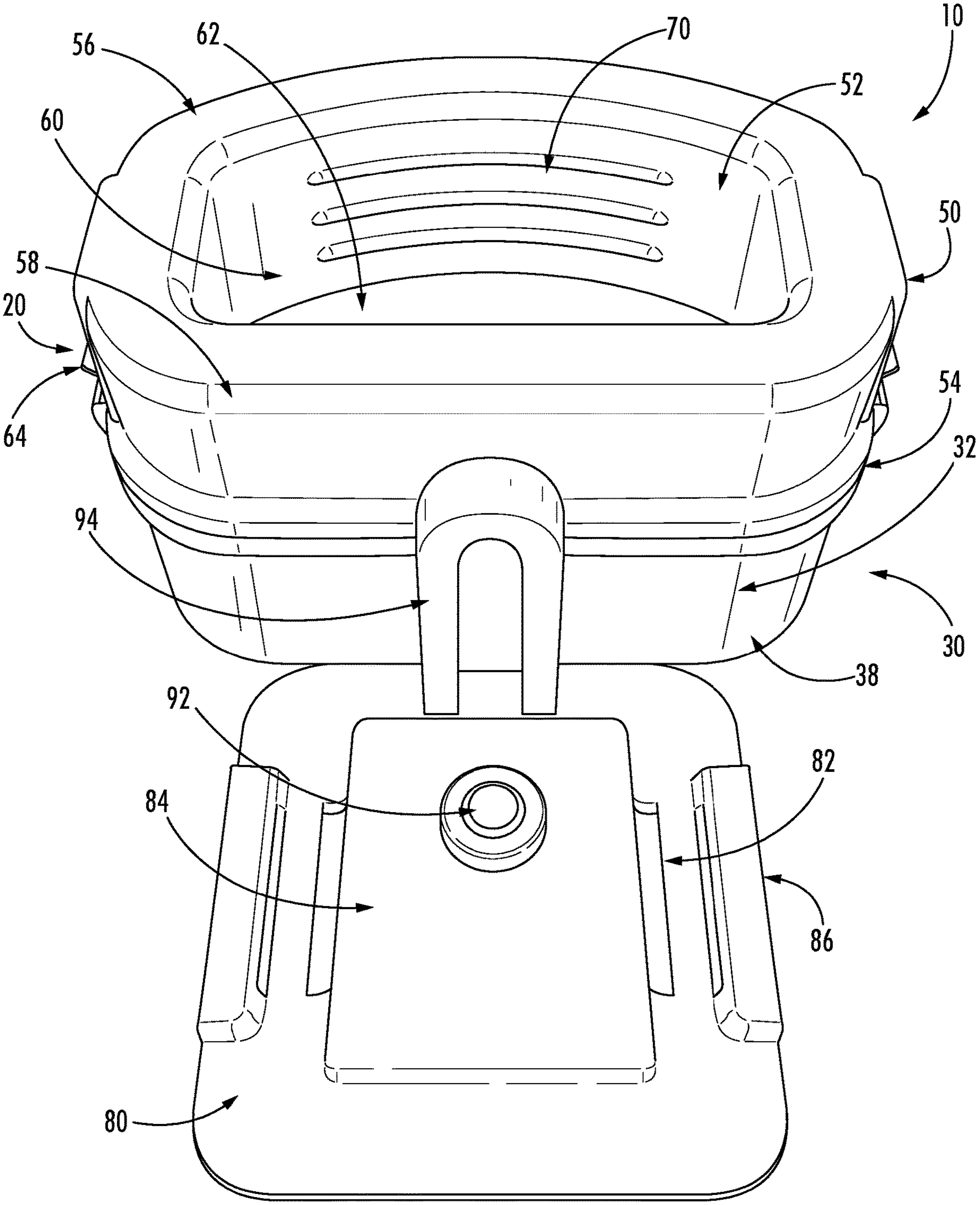
FIG. 3 is a perspective top view of the belt mounted paint and applicator holder apparatus with the bucket belt coupler separable from the top and bucket portions.
Figure 4:
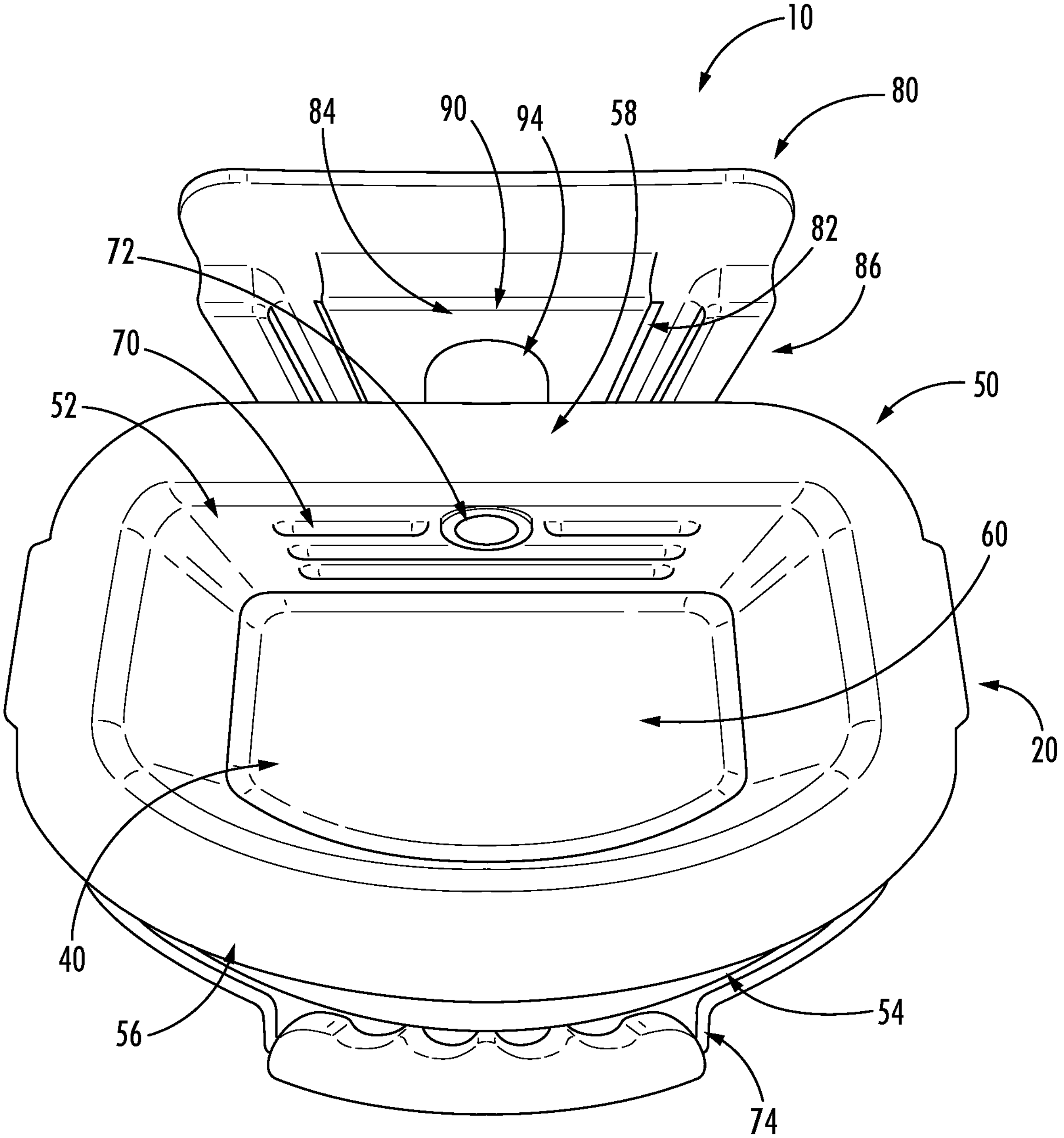
FIG. 4 is a top view of the belt mounted paint and applicator holder apparatus in an assembled state.
Figure 5:
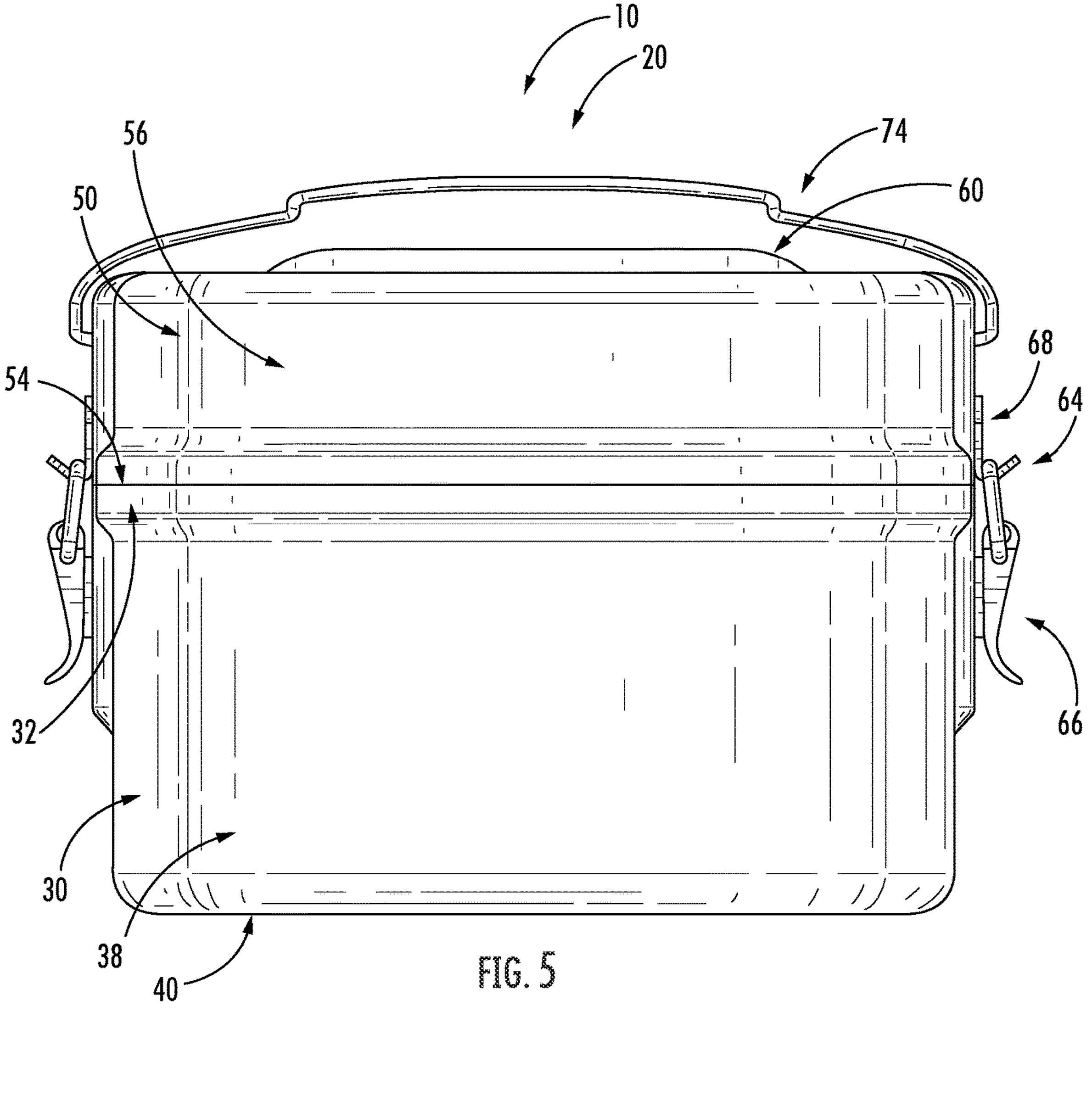
FIG. 5 is a front view of the belt mounted paint and applicator holder apparatus in a clasped position.

As shown in FIG. 1, a belt mounted paint and applicator holder apparatus 10 adapted for stability and convenience, comprising of a bucket portion 30, top portion 50, bucket belt coupler 80, and a quick connect self-leveling mechanism 90. The apparatus 10 is mounted on a belt (not shown) of a painter around the waist. The apparatus 10 allows for holding paint nearest the painter without the use of his/her hands. The apparatus is preferably constructed from a non-stick plastic so as to allow dried paint to be easily peeled off during clean up.

Figure 6:
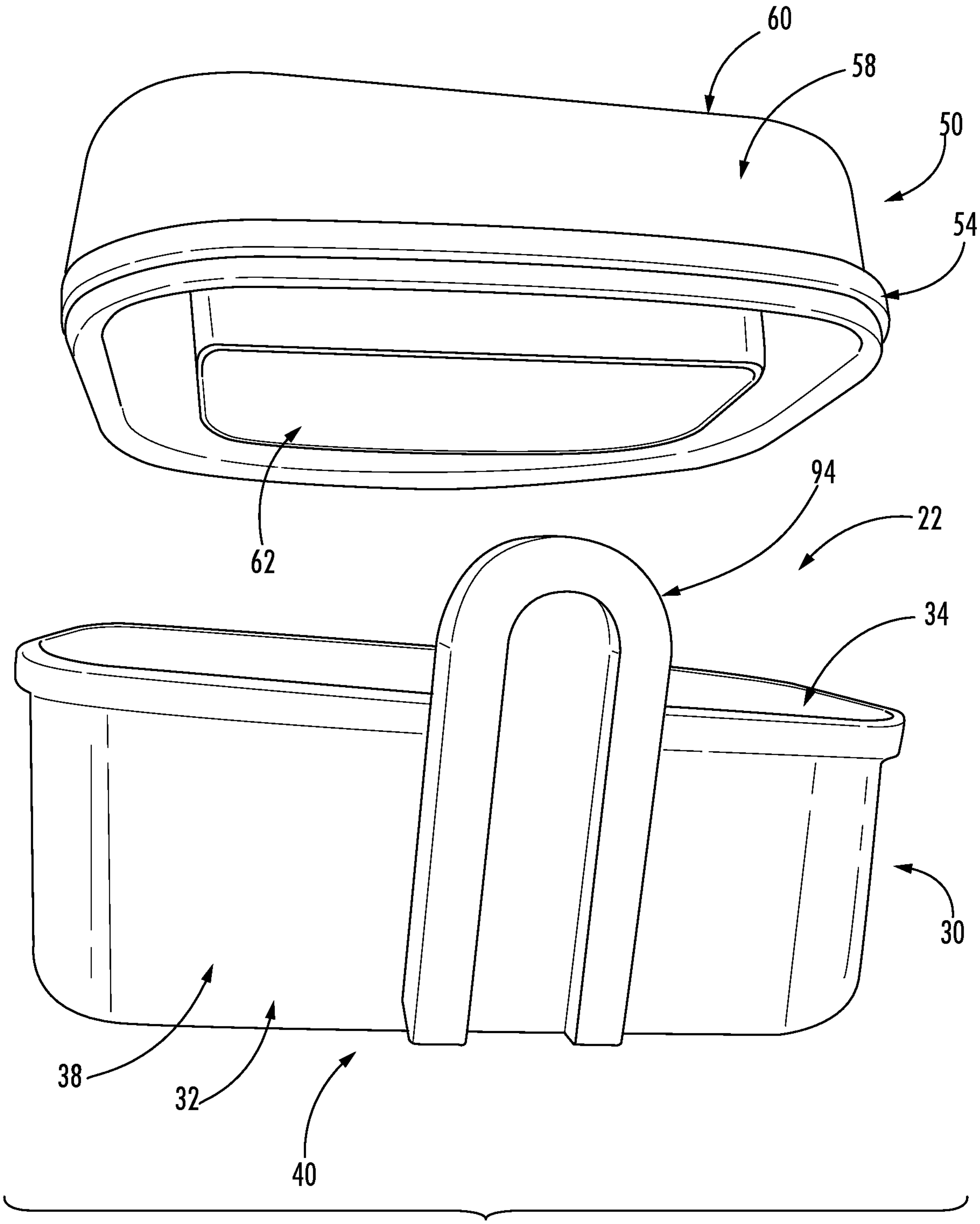
FIG. 6 is a back perspective view of the top portion of the belt mounted paint and applicator holder apparatus.

As shown in FIGS. 2-6, the bucket portion 30 includes a peripheral wall 32 having an upper open end 34, inner surface 36, outer surface 38, and a closed lower end 40. The top portion 50 is nestable on the bucket portion upper open end 34. The top portion 50 includes a front end 56, back end 58, interior surface 52, open top end 60 and an open bottom end 62 in fluid communication with the bucket portion 30. The top portion 50 includes an exterior surface peripheral lip 54 that at least abuts the peripheral wall 32 on the bucket portion 30 when in a clasped position 20. The clasped position 20 is comprised of a pair of toggle latches 64 that cooperate to clasp the top portion 50 and bucket portion 30. More specifically, the top portion 50 has a pair of opposing catches 68, shown in FIG. 2, on the peripheral lip 54 between the front end 56 and back end 58 to cooperate with a pair of corresponding opposing latches 66 on the bucket portion outer surface 38, thereby forming a clasped position 20 when the bucket portion 30 and top portion 50 are nestled together. The unclasped position 22 removes the top portion 50 from the bucket portion 30. As shown in FIG. 6, the open top end 60 has an opening that is greater than the opening on open bottom end 62. The top portion 50 further includes a plurality of ridges 70 on the interior surface 52 thereof nearest the open top end 60 to remove excess paint from an applicator, the ridges 70 may be disposed on the front end 56 or back end 58 or both. A magnet 72 is disposed on the interior surface 52 thereof nearest the open top end 60 to attach a metal applicator when not in use. Lastly, the top portion 50 includes a pivoting handle 74 extending from one end to an opposite end.

The bucket belt coupler 80 has an ergonomic shape to contour to the arched shape of a painter's waist. The bucket belt coupler 80 includes a pair of first vertical slots 82 for insertion of a belt therethrough and a raised surface 84 disposed between the first vertical slots 82. Furthermore, the bucket belt coupler 80 includes a second pair of vertical slots 86 spaced apart from each other at a position further out from the first vertical slots 82. The second pair of vertical slots provide greater contact surface area between a painter's belt and the apparatus 12, alleviating sag.

The quick-connect self-leveling coupling mechanism 90 includes a raised rounded knob 92 on the raised surface 84 of the bucket belt coupler 80, and an inverted U-shaped flange 94 on the back end 58 of the top portion 50 for pairing with the raised rounded knob 92 to allow the top portion 50 and bucket portion 30 (when in the clasped position 20) the ability to rotate thereabout the raised rounded knob 92. This is the self-leveling aspect of the apparatus 10 that allows for the painter to bend, turn, or contort without spilling paint therefrom.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A belt mounted paint and applicator holder apparatus adapted for stability and convenience comprising of:

a bucket portion having a peripheral wall having an upper open end, inner surface, outer surface, and closed lower end;

a top portion being releasably coupled to said bucket portion upper open end, said top portion having a front end, back end, interior surface, open top end and an open bottom end in fluid communication with said bucket portion, said top portion having a pair of opposing toggle latches on a peripheral lip between said front end and said back end to cooperate with a corresponding toggle latch on said bucket outer surface, forming a clasped position when said bucket portion and said top portion are coupled together, wherein said top portion open top end has an opening greater than opening on said open bottom end, and wherein said top portion includes an exterior surface peripheral lip that at least abuts said peripheral wall on said bucket portion when in said clasped position;

a plurality of ridges on said interior surface of said top portion nearer to said open top end than said bottom end to remove excess paint from an applicator;

a magnet disposed on said interior surface of said top portion nearer to said open top end than to said bottom end, wherein said magnet secures a paint brush having a metal applicator when not in use;

a bucket belt coupler having a pair of first vertical slots for insertion of a belt therethrough and a raised surface disposed between first slots wherein said bucket belt coupler includes a second pair of vertical slots spaced apart from each other at a position further out from said first slots; and a quick-connect self-leveling coupling mechanism including a raised rounded knob on said raised surface of said bucket belt coupler and an inverted U-shaped flange on said back end of said top portion for pairing with said raised rounded knob to allow said top portion and bucket portion, when in said clasped position, the ability to rotate thereabout said raised rounded knob.

2. The belt mounted paint and applicator holder apparatus of claim 1, including a pivoting handle extending from one end to an opposite end on said top portion.

3. The belt mounted paint and applicator holder apparatus of claim 1, wherein said pair of opposing toggle latches comprise of a catch on said peripheral lip between said front and back end and a latch on said bucket outer surface.

4. The belt mounted paint and applicator holder apparatus of claim 1, wherein an unclasped position removes said top portion from the bucket portion.

5. The belt mounted paint and applicator holder apparatus of claim 1, wherein said bucket belt coupler is ergonomically shaped.

* * * * *